US008541524B2

(12) United States Patent
Fringant et al.

(10) Patent No.: US 8,541,524 B2
(45) Date of Patent: Sep. 24, 2013

(54) FREE-RADICAL POLYMERIZATION PROCESS IN AQUEOUS DISPERSION FOR THE PREPARATION OF A BLOCK COPOLYMER AT LEAST ONE BLOCK OF WHICH IS A BLOCK OF A HALOGENATED POLYMER

(75) Inventors: Christophe Fringant, Tavaux (FR);
Yves Vanderveken, Hervelee (BE);
Patrick Lacroix-Desmazes, Montpellier (FR); Jeff Tonnar, Kehlen (LU)

(73) Assignee: Solvay (Societe Anonyme), Brussels (BE)

( * ) Notice: Subject to any disclaimer, the term of this patent is extended or adjusted under 35 U.S.C. 154(b) by 638 days.

(21) Appl. No.: 12/305,255

(22) PCT Filed: Jul. 4, 2007

(86) PCT No.: PCT/EP2007/056778
§ 371 (c)(1),
(2), (4) Date: Dec. 17, 2008

(87) PCT Pub. No.: WO2008/003728
PCT Pub. Date: Jan. 10, 2008

(65) Prior Publication Data
US 2009/0292071 A1 Nov. 26, 2009

Related U.S. Application Data

(60) Provisional application No. 60/818,276, filed on Jul. 5, 2006.

(30) Foreign Application Priority Data

Jul. 4, 2006 (FR) ...................................... 06 06079

(51) Int. Cl.
*C08F 2/16* (2006.01)

(52) U.S. Cl.
USPC ........... 526/238; 524/800; 524/832; 524/807; 524/834; 524/835; 524/825; 526/227; 526/229; 526/237; 526/343

(58) Field of Classification Search
USPC ......... 524/800, 832, 807, 834, 835; 526/227, 526/229, 237, 238, 343
See application file for complete search history.

(56) References Cited

U.S. PATENT DOCUMENTS

| 3,467,636 | A | 9/1969 | Nersasian | |
|---|---|---|---|---|
| 5,459,211 | A | 10/1995 | Martin et al. | |
| 7,078,473 | B2 * | 7/2006 | Lacroix-Desmazes et al. | 526/343 |
| 7,208,558 | B2 * | 4/2007 | Lacroix-Desmazes et al. | 526/343 |
| 7,285,597 | B2 * | 10/2007 | Lacroix-Desmazes et al. | 525/276 |
| 2003/0078353 | A1 | 4/2003 | Percec et al. | |
| 2005/0171312 | A1 | 8/2005 | Lacroix-Desmazes et al. | |
| 2006/0205906 | A1 | 9/2006 | Lacroix-Desmazes et al. | |
| 2007/0066781 | A1 | 3/2007 | Lacroix-Desmazes et al. | |
| 2007/0155929 | A1 | 7/2007 | Lacroix-Desmazes et al. | |
| 2009/0306302 | A1 * | 12/2009 | Lacroix-Desmazes et al. | 525/279 |

FOREIGN PATENT DOCUMENTS

| EP | 0947527 A1 | 10/1999 |
|---|---|---|
| EP | 1622853 A1 | 2/2006 |
| GB | 1497515 A | 1/1978 |
| WO | WO03097704 A1 | 11/2003 |
| WO | WO03097705 A1 | 11/2003 |
| WO | WO2004094356 A1 | 11/2004 |

OTHER PUBLICATIONS

Tonnar et al. Macromolecules 2007, 40, pp. 186-190.*
PCT International Search Report dated Oct. 18, 2007 for International Patent Application No. PCT/EP2007/056778 (2 pp.).
PCT International Preliminary Report on Patentability dated Jan. 6, 2009 including the Written Opinion from ISA, for International Patent Application No. PCT/EP2007/056778 (7 pp.).
Search Report dated Feb. 16, 2007 from Institut National De La Propriete Industrielle for French Patent Application No. 06.06079 (2 pp.).
U.S. Appl. No. 12/774,844, filed May 6, 2010, Lacroix-Desmazes, et al.

* cited by examiner

*Primary Examiner* — Mark Eashoo
*Assistant Examiner* — Michael A Salvitti
(74) *Attorney, Agent, or Firm* — Oblon, Spivak, McClelland, Maier & Neustadt, L.L.P.

(57) ABSTRACT

Process of controlled free-radical polymerization in aqueous dispersion for the preparation of a block copolymer at least one block of which is a block of a halogenated polymer using molecular iodine and at least one oxidant whose solubility in water is at least 10 g/l for the synthesis of the first block of the block copolymer.

20 Claims, No Drawings

FREE-RADICAL POLYMERIZATION PROCESS IN AQUEOUS DISPERSION FOR THE PREPARATION OF A BLOCK COPOLYMER AT LEAST ONE BLOCK OF WHICH IS A BLOCK OF A HALOGENATED POLYMER

CROSS-REFERENCE TO RELATED APPLICATIONS

The present application is a U.S. national stage application under 35 U.S.C. §371 of International Application No. PCT/EP2007/056778, filed Jul. 4. 2007, which claims the benefit of U.S. provisional application 60/818,276 filed on Jul. 5, 2006, these applications being herein incorporated by reference in their entirety for all purposes.

The present invention relates to a controlled free-radical polymerization process in aqueous dispersion for the preparation of a block copolymer at least one block of which is a block of a halogenated polymer.

Although free-radical polymerization is the chain polymerization mechanism capable of accepting the least demanding experimental conditions and the largest range of monomers, there is a very longstanding and major shortcoming in respect of giving this process the characteristics of a living polymerization. The main limitation of conventional free-radical polymerization originates in the decisive significance of the irreversible termination reactions via combination and/or dismutation of the free radicals, ensuring the growth of the chains. The growing chains are initiated and increase their size then become terminated in a random and irreversible manner, in parallel with the initiation of new chains. The polymerization becomes terminated when all of the polymeric chains are inactive, these being of variable and unpredictable length. This technique therefore offers only few possibilities of influencing molecular weight, molecular weight distribution, the nature of the chain ends and, more generally, the molecular structure of the polymer.

In recent years, significant and successful attempts have been made to develop novel techniques of free-radical polymerization permitting minimization of the relative significance of irreversible termination reactions in comparison with initiation reactions and propagation reactions. These techniques are termed controlled free-radical polymerization. The characteristic common to the techniques developed is the use of a control agent (X) which brings about transient conversion of the free radical of the growing chain to a dormant species (P-X), i.e. in equilibrium with the active species (P).

Among the best known methods mention may be made of free-radical polymerization controlled by nitroxides (nitroxide-mediated polymerization or NMP), atom transfer (atom transfer radical polymerization or ATRP), chain transfer by addition-fragmentation (reversible addition-fragmentation chain transfer polymerization or RAFT/MADIX) and iodine transfer (iodine transfer polymerization or ITP), the control agents used respectively in these comprising nitroxide radicals, activated halides in the presence of metal complexes, dithiocarbonyl compounds and iodinated organic molecules.

Although these methods have been studied successfully in the case of polymerization in solution and in bulk, few studies have concerned polymerization in aqueous dispersion, which is widely used in industry.

Among them, patent application EP-A-0 947 527 discloses the synthesis of waterborne block copolymers by ITP or ATRP processes. The particular iodine transfer agents used in the ITP process described in this patent application as well as the activated halides and metal complexes used for the ATRP process present the disadvantages of being expensive products, difficult to prepare as well as to handle and are usually unstable.

Another technique developed more recently is that of reverse iodine transfer (reverse iodine transfer polymerization or RITP) using molecular iodine as control agent. For example, patent application WO 03/097704 discloses a controlled process of free-radical polymerization of this type according to which at least one ethylenically unsaturated monomer is polymerized in the presence of at least one free-radical generator and of molecular iodine.

In the particular case of RITP polymerization, where one molecule of molecular iodine controls two polymerization chains, the intended average molecular weight ($M_n$) of the polymer, for 100% conversion, is controlled by the ratio between the weight of monomer and twice the number of initial moles of iodine ($n_{I2,initial}$) according to equation 1 below, in which $M_{A-I}$ is the molecular weight of the chain ends:

$$M_n = (\text{weight of monomer})/(2 \times n_{I2,initial}) + M_{A-I} \quad \text{(equation 1)}$$

Although the text of application WO 03/097704 describes the homopolymerization of vinyl chloride in aqueous suspension, the process concerned does not however provide access to a polymer whose experimental average molecular weight (20 000) is very close to the theoretical average molecular weight (intended molecular weight taking account of the degree of conversion) (8700). On the contrary, the ratio between experimental molecular weight and theoretical molecular weight is of 2.29 i.e. very far from 1 which is the value corresponding to a very good control. An optimum control of the free-radical polymerization is therefore not reached. WO 03/097704 does neither describe how to prepare a block copolymer at least one block of which is a block of a halogenated polymer in an aqueous dispersion with an optimized control of the molecular weight.

There is therefore still a need to develop a process for the preparation of such block copolymers in aqueous dispersion by free-radical polymerization characterized by an optimum control of the molecular weights.

It is therefore an object of the present invention to provide a process of controlled free-radical polymerization in aqueous dispersion for the preparation of a block copolymer at least one block of which is a block of a halogenated polymer, which permits better control of the polymerization and therefore of the average molecular weight of the block copolymer obtained, when comparison is made with the processes of the prior art, while retaining their advantages.

The invention therefore relates to a process of controlled free-radical polymerization in aqueous dispersion for the preparation of a block copolymer at least one block of which is a block of a halogenated polymer using molecular iodine and at least one oxidant whose solubility in water is at least 10 g/l for the synthesis of the first block of the block copolymer.

The term "block copolymer" is intended to denote a copolymer in which a linking of more or less lengthy sequences formed of the same monomer or of different monomers is observed.

By way of illustration of a block copolymer in which a linking of more or less lengthy sequences formed of the same monomer, the following scheme illustrates a representation, among others, of such a copolymer comprising two blocks, a first one constituted by monomer A and a second one constituted by monomer B: AAAAAAAABBBBBBBB.

At least one of the blocks may however be constituted by a linking of more or less lengthy sequences formed of different monomers that may be arranged so that this block is a copolymer arranged in a random structure, a copolymer arranged in an alternating structure or a copolymer arranged in a gradient structure.

The term "copolymer arranged in a random structure" is intended to denote a copolymer in which the distribution of the monomers all along the chain is random and the proportion of which is statistically the same all along the chain. By way of illustration, the following scheme illustrates a representation, among others, of such a copolymer comprising the monomers C and D CCDCCCDDCDDDDCCD.

The term "copolymer arranged in an alternating structure" is intended to denote a copolymer in which the monomers composing the copolymer are linked together alternately all along the chain. By way of illustration, the following scheme illustrates the representation, among others, of such a copolymer comprising the monomers C and D: CDCDCDCDCD-CDCD.

The term "copolymer arranged in a gradient structure" is intended to denote a copolymer composed of at least two monomers in which the relative proportion of one monomer with respect to the other(s) increases or decreases all along the chain. By way of illustration, the following scheme illustrates a representation, among others, of such a copolymer comprising the monomers C and D: CCCDCCDDCDDDDD.

The block copolymer prepared by the process according to the invention may advantageously comprise two or more than two blocks. It can therefore be a two block copolymer, a three block copolymer or a copolymer of more than three blocks. Preferably, the block copolymer prepared by the process according to the invention is a two block copolymer, in others words, a copolymer containing two blocks.

The process according to the invention is a process for the preparation of a block copolymer at least one block of which is a block of a halogenated polymer.

By "at least one block of which is a block of a halogenated polymer", it is meant that one or more than one block of the block copolymer are blocks of a halogenated polymer.

By halogenated polymer, it is meant a polymer resulting from the polymerization of at least one halogenated vinyl monomer.

The expression polymerization in aqueous dispersion means processes of polymerization taking place in water. The process may take place in the presence or in the absence of at least one surfactant. Preferably, the process takes place in the presence of at least one surfactant The expression at least one surfactant means that the process of polymerization can take place in the presence of one or more surfactants.

The expression surfactant means any compound whose structure has one or more hydrophilic portions and one or more hydrophobic portions. This hydrophilic/hydrophobic balance allows the surfactant to have interfacial activity which can ensure dispersion and stabilization of the aqueous and organic phases present.

Among surfactants, mention may be made of dispersing agents, also termed protective colloids or suspending agents (hereinafter termed dispersing agents), and also of emulsifying agents.

The expression polymerization in aqueous dispersion means free-radical polymerization in aqueous suspension, free-radical polymerization in aqueous microsuspension, free-radical polymerization in aqueous emulsion and free-radical polymerization in aqueous mini-emulsion.

The expression free-radical polymerization in aqueous suspension means any process of free-radical polymerization taking place in an aqueous medium in the presence of dispersing agents as surfactants and of oil-soluble free-radical generators.

The expression polymerization in aqueous microsuspension, or in homogenized aqueous dispersion, means any process of free-radical polymerization in which oil-soluble free-radical generators are used and an emulsion of droplets monomers is produced by virtue of vigorous mechanical agitation, and characterized by the presence of emulsifying agents as surfactants.

The expression free-radical polymerization in aqueous emulsion means any process of free-radical polymerization taking place in an aqueous medium in the presence of emulsifying agents as surfactants and of water-soluble free-radical generators. Polymerization in aqueous emulsion is also sometimes termed polymerization in emulsion ab initio.

The expression polymerization in aqueous mini-emulsion means any process of free-radical polymerization in which oil-soluble free-radical generators and/or water-soluble free-radical generators are used alongside a hydrophobic agent, and an emulsion of droplets of monomers is produced by virtue of vigorous mechanical agitation, and characterized by the presence of emulsifying agents and optionally of dispersing agents as surfactants.

Examples which may be mentioned as dispersing agents are partially hydrolyzed polyvinyl acetates, gelatine, starch, polyvinylpyrrolidinone, copolymers of vinyl acetate and of maleic anhydride, water-soluble derivatives of cellulosic ethers, e.g. methylcellulose, ethylcellulose, carboxymethylcellulose, hydroxypropylmethylcellulose, hydroxyethylcellulose and hydroxypropylcellulose.

The dispersing agents are preferably water-soluble derivatives of cellulosic ethers. Among these, particular preference is given to hydroxypropylmethyl-cellulose.

The emulsifying agents can be anionic emulsifying agents, non-ionic emulsifying agents or cationic emulsifying agents.

Among the anionic emulsifying agents, non-limiting mention may be made of alkyl sulphates, such as sodium lauryl sulphate, alkyl sulphonates, such as sodium dodecylbenzene-sulphonate and sodium 1-hexadecanesulphonate, pure or in the form of a mixture of $C_{12}$-$C_{20}$-alkylsulphonates sometimes termed paraffinsulphonates, alkylarylmono- or -disulphonates and dialkyl sulphosuccinates, such as sodium diethylhexylsulphosuccinate and sodium dihexylsulphosuccinate.

Among the non-ionic emulsifying agents, non-limiting mention may be made of alkyl- or alkylarylethoxy derivatives, alkyl- or alkylarylpropoxy derivatives and sugar ethers or esters.

Among the cationic emulsifying agents, mention may be made of ethoxylated alkylamines and of propoxylated alkylamines.

The emulsifying agents are preferably anionic emulsifying agents, optionally in a mixture with one or more non-ionic emulsifying agents. Particular preference is given to anionic emulsifying agents.

The hydrophobic agents can be alkanes, such as hexadecane, silanes, siloxanes, perfluorinated alkanes or compounds usually used as pigments, comonomers, transfer agents, initiators or plasticizers, as long as they are hydrophobic.

The process according to the invention is such that molecular iodine and at least one oxidant whose solubility in water is at least 10 g/l are used for the synthesis of the first block of the block copolymer.

The process according to the invention is therefore advantageously characterized by the fact that the first block of the block copolymer is prepared using (A) at least one ethylenically unsaturated monomer of which one is used as main monomer and is chosen among styrene and its derivatives, acrylic acid and its derivatives, methacrylic acid and its derivatives, dienes, vinyl esters, vinyl ethers, vinyl derivatives of pyridine, vinylsulphonic acid and its derivatives, vinylphosphonic acid and its derivatives, N-vinyl monomers and halogenated vinyl monomers, (B) at least one free-radical generator chosen among diazo compounds, peroxides and dialkyldiphenylalkanes, (C) molecular iodine, and (D) at least one oxidant whose solubility in water is at least 10 g/l, at least one of which can be one of (B);

which comprises steps according to which (1) at least one fraction of each of the compounds (A), (B), (C) and (D) is introduced into a reactor;

(2) the contents of the reactor are reacted while introducing any balance of each of the compounds (A), (B), (C) and (D) therein; and (3) an aqueous dispersion comprising the polymer constituting the first block of the block copolymer is obtained.

The process for preparation of block copolymers according to the invention uses at least one free-radical generator chosen among diazo compounds, peroxides and dialkyldiphenylalkanes.

The expression at least one free-radical generator chosen among diazo compounds, peroxides and dialkyldiphenylalkanes means that the process of polymerization can use one or more free-radical generators chosen among diazo compounds, peroxides and dialkyldiphenylalkanes.

In the remainder of the text, the expression "free-radical generator" used in the singular or in the plural must be understood to mean one or more free-radical generators, unless otherwise stated.

The process according to the invention preferably uses at least one free-radical generator chosen among diazo compounds and peroxides.

The process according to the invention particularly preferably uses one single free-radical generator.

The free-radical generators can be oil-soluble or water-soluble.

The expression oil-soluble free-radical generators means free-radical generators soluble in the monomer(s), e.g. those used for polymerization in aqueous suspension, in microsuspension or in aqueous mini-emulsion.

The expression water-soluble free-radical generators means free-radical generators soluble in water, e.g. those used for polymerization in aqueous emulsion or in aqueous mini-emulsion.

The water-soluble free-radical generator can be an oxidant, e.g. those defined below.

Examples which may be mentioned of oil-soluble diazo compounds are 2,2'-azobis(4-methoxy-2,4-dimethylvaleronitrile),
2,2'-azobis(2,4-dimethylvaleronitrile),
phenylethyl)azodiphenylmethane,
2,2'-azobisisobutyronitrile,
dimethyl 2,2'-azobisisobutyrate,
diethyl 2,2'-azobisisobutyrate,
1,1'-azobis(1-cyclohexanecarbonitrile),
2,2'-azobis(2-methylbutyronitrile),
2,2'-azobis(2,4,4-trimethylpentane),
2-phenylazo-2,4-dimethyl-4-methoxyvaleronitrile, and
2,2'-azobis(2-methylpropane).

Dimethyl 2,2'-azobisisobutyrate and diethyl 2,2'-azobisisobutyrate are particularly preferred oil-soluble free-radical generators for the process of the present invention but also for any other process related to the synthesis of polymers or copolymers (of any kind) of vinylidene chloride.

Examples which may be mentioned of water-soluble diazo compounds are 2-(carbamoylazo)isobutyronitrile,
4,4'-azobis(4-cyanovaleric) acid,
ammonium 4,4'-azobis(4-cyanovalerate),
sodium 4,4'-azobis(4-cyanovalerate),
potassium 4,4'-azobis(4-cyanovalerate),
2,2'-azobis(N,N'-dimethyleneisobutyramidine),
2,2'-azobis(N,N'-dimethyleneisobutyramidine) hydrochloride,
2,2'-azobis(2-amidinopropane) hydrochloride,
2,2'-azobis[2-methyl-N-(1,1-bis(hydroxymethyl)-2-hydroxyethyl)-propionamide],
2,2'-azobis[2-methyl-N-(1,1-bis(hydroxymethyl)ethyl) propionamide],
2,2'-azobis[2-methyl-N-(2-hydroxyethyl)propionamide], and
2,2'-azobis(isobutyramide) dihydrate.

Preference is given to 4,4'-azobis(4-cyanovaleric) acid, ammonium 4,4'-azobis(4-cyanovalerate), sodium 4,4'-azobis(4-cyanovalerate) and potassium 4,4'-azobis(4-cyanovalerate).

Examples which may be mentioned of oil-soluble peroxides are diacyl peroxides, such as dilauroyl peroxide, dibenzoyl peroxide, didecanoyl peroxide,
succinoyl peroxide,
organic hydroperoxides, such as cumyl hydroperoxide and tert-amyl hydroperoxide,
dialkyl peroxydicarbonates, such as diethyl peroxydicarbonate, diisopropyl peroxydicarbonate, dimyristyl peroxydicarbonate, dicyclohexyl peroxydicarbonate, di[2-ethylhexyl]peroxydicarbonate, di[4-tert-butyl]cyclohexyl peroxydicarbonate and dicetyl peroxydicarbonate,
peresters, such as tert-amyl perpivalate, tert-butyl perpivalate, tert-amyl peroxyneodecanoate, tert-butyl peroxyneodecanoate and cumyl peroxyneodecanoate.

Examples which may be mentioned of water-soluble peroxides are inorganic peroxides, such as sodium persulphate, potassium persulphate and ammonium persulphate,
tert-butyl hydroperoxide,
hydrogen peroxide and
perborates.

Preference is given to sodium persulphate, potassium persulphate and ammonium persulphate, and also to hydrogen peroxide.

The manner of introduction of the free-radical generator(s) (B) into the process according to the invention can be variable.

Therefore, in the case where (B) consists of a single free-radical generator, the entirety of the free-radical generator can be introduced in step (1) or a fraction thereof can be introduced in step (1) and the balance in step (2). The introduction in step (2) preferably takes place continuously.

In the case where (B) consists of at least two free-radical generators, one portion of the free-radical generators can be introduced in step (1) and the other portion in step (2), preferably continuously.

In the particular case where (B) consists of a mixture of at least two free-radical generators, the entirety of the mixture can be introduced in step (1) or a fraction of the mixture can be introduced in step (1) and the balance of the same mixture in step (2), preferably continuously.

The process according to the invention uses (C) molecular iodine for the synthesis of the first block of the block copolymer. The molecular iodine used can take the form of molecular iodine itself or the form of a precursor thereof.

The expression precursor means a compound capable of forming molecular iodine in the polymerization medium. Examples which may be mentioned of precursors of this type are alkali metal iodides, such as sodium iodide or potassium iodide. The precursor can be converted to molecular iodine by adding an oxidant (D') to the polymerization medium. The oxidant (D') that can be used for this purpose complies with the definition of oxidant (D) detailed hereinafter.

The number of moles of molecular iodine (C), based on the number of moles of (A), is advantageously at least $2.5 \times 10^{-5}$, preferably at least $5 \times 10^{-5}$ and particularly preferably at least $10^{-4}$. Furthermore, the number of moles of molecular iodine (C), based on the number of moles of (A), is advantageously at most $10^{-1}$ and preferably at most $10^{-2}$.

The molar proportion of molecular iodine (C) or of its precursor and of the oxidant (D') introduced into the reactor in step (1) is advantageously at least 50%.

It is preferable that 100% of the molecular iodine (C) or of its precursor and of the oxidant (D') are introduced into the reactor in step (1), from the beginning of step (1) or during step (1). They may be introduced in step (1) all at once or by continuous injection prior to the start of step (2).

The process according to the invention uses (D) at least one oxidant whose solubility in water is at least 10 g/l, at least one of which can be one of (B).

The expression at least one oxidant (D) means that the process of polymerization can use one or more oxidants (D).

In the remainder of the text, the term oxidant used in the singular or in the plural is one or more oxidants, unless otherwise stated.

The expression oxidant (D) means any compound capable of oxidizing the iodide ions to molecular iodine; in other words which is capable of generating an oxidation/reduction reaction with the iodide ions such that the iodide ions are oxidized to molecular iodine and such that the oxidant is reduced to its reduced form, and which therefore has a redox potential greater than that of the $I_2/I^-$ couple (0.53).

The solubility in water of the oxidant (D) according to the invention is at least 10 g/l, preferably at least 20 g/l and particularly preferably at least 30 g/l.

Among the oxidants (D) whose solubility in water is at least 10 g/l, particular mention may be made of sodium persulphate, potassium persulphate, ammonium persulphate, hydrogen peroxide, compounds generating the $MnO_4^-$, $ClO^-$, $ClO_2^-$, $ClO_3^-$ ions, the salts of manganese(III) and the salts of iron(III), e.g. ferric citrate, ammonium ferric citrate, ammonium ferric sulphate, ferric acetylacetonate, ferric bromide, ferric phosphate and ferric pyrophosphate.

Preference is given to sodium persulphate, potassium persulphate, ammonium persulphate and hydrogen peroxide.

The expression at least one oxidant of which at least one can be one of (B) means that at least one of the oxidants (D) is one of the free-radical generators (B), in particular one of the water-soluble free-radical generators (B), or that none of the oxidants is one of the free-radical generators (B), in particular one of the water-soluble free-radical generators (B).

According to the process according to the invention, it is advantageous to reduce the acid pH of the aqueous phase to improve the yield of the reaction.

The manner of introduction of the oxidant(s) (D) into the process according to the invention can be variable. The entirety of (D) can be introduced in step (1) or a fraction thereof can be introduced in step (1) and the balance in step (2). The introduction preferably takes place continuously. The introduction in step (2) preferably takes place continuously.

The entirety of (D) is preferably introduced into the reactor between the start of step (1) and the time of step (2) when the degree of conversion reaches 70%.

According to a first preferred embodiment, the process according to the invention is either a process of polymerization in aqueous suspension or a process of polymerization in aqueous microsuspension, preferably in aqueous suspension, for the preparation of the first block of the block copolymer, using, other than (A) and (C), (B) at least one oil-soluble free-radical generator chosen among oil-soluble diazo compounds and oil-soluble peroxides, and (D) at least one oxidant whose solubility in water is at least 10 g/l, none of which is one of (B), comprising the above-mentioned steps (1) to (3).

The characteristics generally defined above in the context of the process according to the invention apply to the first preferred embodiment of the process according to the invention.

In the particular case of the first preferred embodiment of the process according to the invention, the free-radical generator being oil-soluble, the process uses (D) at least one oxidant whose solubility in water is at least 10 g/l.

In the particular case of the first preferred embodiment of the process according to the invention it is advantageous that none of the oxidants is one of the free-radical generators (B).

In the particular case of the first preferred embodiment of the process according to the invention, one single oil-soluble free-radical generator (B) is preferably used.

According to this first preferred embodiment, one single oxidant is preferably used as oxidant (D). The preferred oxidant (D) is hydrogen peroxide.

According to this first embodiment, in the illustrative case where the molecular iodine (C) is used in the form of a precursor, it is then necessary to add an oxidant (D') to the polymerization medium to generate the iodine, the oxidant (D') added is preferably hydrogen peroxide.

The total number of moles of oxidant (oxidant (D) and optionally oxidant (D')), based on the number of moles of molecular iodine, is preferably at least 0.5, particularly preferably at least 1.5, very particularly preferably at least 2 and especially very particularly preferably at least 3. A ratio of at least 4 is particularly advantageous.

The total number of moles of oxidant (oxidant (D) and optionally oxidant (D')), based on the number of moles of molecular iodine, is preferably at most 10, more preferably at most 9.

According to a second preferred embodiment, the process according to the invention is a process of polymerization in aqueous emulsion for the preparation of the first block of the block copolymer, using, other than (A) and (C), (B) at least one water-soluble free-radical generator chosen among water-soluble diazo compounds and water-soluble peroxides, and (D) at least one oxidant whose solubility in water is at least 10 g/l, at least one of which can be one of (B) comprising the above-mentioned steps (1) to (3).

The characteristics generally defined above in the context of the process according to the invention are applicable to the second preferred embodiment of the process according to the invention.

According to the second preferred embodiment of the process according to the invention, at least one of the oxidants (D) can be one of the water-soluble free-radical generators (B), and it is preferable that at least one of the oxidants (D) is one of the water-soluble free-radical generators (B).

The total number of moles of oxidants (oxidant (D) and optionally oxidant (D')) and of free-radical generators (B), based on the number of moles of molecular iodine, is preferably at least 1.5, particularly preferably at least 2, very particularly preferably at least 2.5 and especially very particularly preferably at least 3. A ratio of at least 4 is particularly advantageous.

The total number of moles of oxidants (oxidant (D) and optionally oxidant (D')) and of free-radical generators (B), based on the number of moles of molecular iodine, is preferably at most 11; more preferably at most 10.

According to a first particularly preferred variant of the second preferred embodiment of the process according to the invention, the process according to the invention is a process of polymerization in aqueous emulsion for the preparation of the first block of the block copolymer, using, other than (A) and (C),
(B) at least one water-soluble free-radical generator chosen among water-soluble diazo compounds and water-soluble peroxides, and
(D) one oxidant whose solubility in water is at least 10 g/l, which is one of (B), and comprising the above-mentioned steps (1) to (3).

According to a first subvariant of the first particularly preferred variant, the process according to the invention is a process of polymerization in aqueous emulsion for the preparation of the first block of the block copolymer, using, other than (A) and (C),
(B) one water-soluble free-radical generator chosen among water-soluble diazo compounds and water-soluble peroxides, and
(D) one oxidant whose solubility in water is at least 10 g/l, which is (B), and comprising the above-mentioned steps (1) to (3).

The free-radical generator and oxidant is preferably chosen among sodium persulphate, ammonium persulphate and potassium persulphate.

According to this first subvariant, in the illustrative case where the molecular iodine (C) is used in the form of a precursor, it is then necessary to add an oxidant (D') to the polymerization medium to generate the iodine, the oxidant (D') can be the free-radical generator (B) and oxidant (D) or an oxidant (D') other than (B), for example hydrogen peroxide. The oxidant (D') is preferably the free-radical generator (B) and oxidant (D).

According to a second subvariant of the first particularly preferred variant, the process according to the invention is a process of polymerization in aqueous emulsion for the preparation of the first block of the block copolymer, using, other than (A) and (C),
(B) two water-soluble free-radical generators chosen among water-soluble diazo compounds and water-soluble peroxides, and
(D) one oxidant whose solubility in water is at least 10 g/l, which is one of (B), comprising the above-mentioned steps (1) to (3).

One of the free-radical generators is preferably chosen among ammonium 4,4'-azobis(4-cyanovalerate), sodium 4,4'-azobis(4-cyanovalerate) and potassium 4,4'-azobis(4-cyanovalerate), the other, which is also the oxidant (D), being hydrogen peroxide.

According to this second subvariant, in the illustrative case where the molecular iodine (C) is used in the form of a precursor, it is then necessary to add an oxidant (D') to the polymerization medium to generate the iodine, the oxidant (D') is preferably the oxidant (D), particularly preferably therefore being hydrogen peroxide.

The first subvariant is preferred to the second subvariant.

According to a second preferred variant of the second preferred embodiment of the process according to the invention, the process according to the invention is a process of polymerization in aqueous emulsion for the preparation of the first block of the block copolymer, using, other than (A) and (C),
(B) at least one water-soluble free-radical generator chosen among water-soluble diazo compounds and water-soluble peroxides, and
(D) two oxidants whose solubility in water is at least 10 g/l, each being one of (B), comprising the above-mentioned steps (1) to (3).

According to this second variant of the second preferred embodiment of the process according to the invention, the process uses a persulphate chosen among sodium persulphate, ammonium persulphate and potassium persulphate, and uses hydrogen peroxide.

According to this second variant, in the illustrative case where the molecular iodine (C) is used in the form of a precursor, it is then necessary to add an oxidant (D') to the polymerization medium to generate the iodine, the oxidant (D') can be one of the two oxidants (D) or an oxidant other than the two oxidants (D). The oxidant (D') is preferably one of the two oxidants (D), particularly preferably therefore being one of the above-mentioned persulphates or hydrogen peroxide.

According to a third variant of the second preferred embodiment of the process according to the invention, the process according to the invention is a process of polymerization in aqueous emulsion for the preparation of the first block of the block copolymer, using, other than (A) and (C),
(B) at least one water-soluble free-radical generator chosen among oil-soluble diazo compounds and oil-soluble peroxides, and
(D) one oxidant whose solubility in water is at least 10 g/l, which is not one of (B), and comprising the above-mentioned steps (1) to (3).

According to a third preferred embodiment, the process according to the invention is a process of polymerization in aqueous mini-emulsion for the preparation of the first block of the block copolymer, using, other than (A) and (C),
(B) at least one oil-soluble free-radical generator chosen among oil-soluble diazo compounds and oil-soluble peroxides and/or at least one water-soluble free-radical generator chosen among water-soluble diazo compounds and water-soluble peroxides, and
(D) at least one oxidant whose solubility in water is at least 10 g/l, of which at least one can be one of (B), and comprising the above-mentioned steps (1) to (3).

The characteristics generally defined above in the context of the process according to the invention are applicable to the third preferred embodiment of the process according to the invention.

According to a first preferred variant of the third preferred embodiment, the process according to the invention is a process of polymerization in aqueous mini-emulsion for the preparation of the first block of the block copolymer, using, other than (A) and (C),
(B) at least one oil-soluble free-radical generator chosen among oil-soluble diazo compounds and oil-soluble peroxides, and
(D) at least one oxidant whose solubility in water is at least 10 g/l, none of which is one of (B), and comprising the above-mentioned steps (1) to (3).

According to this first preferred variant, the free-radical generator being oil-soluble, the process uses (D) at least one oxidant whose solubility in water is at least 10 g/l.

According to this same variant it is advantageous that none of the oxidants is one of the free-radical generators (B).

According to this same variant, one single oil-soluble free-radical generator (B) is preferably used. One single oxidant is moreover preferably used as oxidant (D). The preferred oxidant (D) is hydrogen peroxide.

According to this first preferred variant of the third embodiment, in the illustrative case where the molecular iodine (C) is used in the form of a precursor, it is then necessary to add an oxidant (D') to the polymerization medium to generate the iodine, the oxidant (D') added is preferably hydrogen peroxide.

The total number of moles of oxidant (oxidant (D) and optionally oxidant (D')), based on the number of moles of molecular iodine, is preferably at least 0.5, particularly preferably at least 1.5, very particularly preferably at least 2 and especially very particularly preferably at least 3. A ratio of at least 4 is particularly advantageous.

The total number of moles of oxidant (oxidant (D) and optionally oxidant (D')), based on the number of moles of molecular iodine, is preferably at most 10, more preferably at most 9.

According to a second variant of the third preferred embodiment, the process according to the invention is a process of polymerization in aqueous mini-emulsion for the preparation of the first block of the block copolymer, using, other than (A) and (C), (B) at least one water-soluble free-radical generator chosen among water-soluble diazo compounds and water-soluble peroxides, and (D) at least one oxidant whose solubility in water is at least 10 g/l, at least one of which is one of (B), and comprising the above-mentioned steps (1) to (3).

According to this second variant, the free-radical generator being water-soluble, the process uses (D) at least one oxidant whose solubility in water is at least 10 g/l, at least one of which is one of (B).

According to this same variant, one single water-soluble free-radical generator (B) is preferably used. One single oxidant is moreover preferably used as oxidant (D). The water-soluble free-radical generator and the oxidant (D) are particularly preferably the same compound. The oxidant (D) and free-radical generator (B) is particularly preferably chosen among sodium persulphate, potassium persulphate and ammonium persulphate.

According to this second variant of the third embodiment, in the illustrative case where the molecular iodine (C) is used in the form of a precursor, it is then necessary to add an oxidant (D') to the polymerization medium to generate the iodine, the oxidant (D') added is preferably the free-radical generator (B) and oxidant (D).

The total number of moles of oxidants (oxidant (D) and optionally oxidant (D')) and of free-radical generators (B), based on the number of moles of molecular iodine, is preferably at least 1.5, particularly preferably at least 2, very particularly preferably at least 2.5 and especially very particularly preferably at least 3. A ratio of at least 4 is particularly advantageous.

The total number of moles of oxidants (oxidant (D) and optionally oxidant (D')) and of free-radical generators (B), based on the number of moles of molecular iodine, is preferably at most 11; more preferably at most 10.

The second embodiment is particularly preferred among the first, second and third embodiments. Among the variants of the second embodiment, the first subvariant of the first particularly preferred variant involving the use of molecular iodine is particularly preferred.

In the case a surfactant is used, when it consists of a single surfactant, the entirety of it can be introduced in step (1) or a fraction thereof can be introduced in step (1) and the balance in step (2). The introduction in step (2) preferably takes place continuously.

In the case where at least two surfactants are used, one portion of the surfactants can be introduced in step (1) and the other portion in step (2), preferably continuously.

In the particular case where a mixture of at least two surfactants is used, the entirety of the mixture can be introduced in step (1) or a fraction of the mixture can be introduced in step (1) and the balance of the same mixture in step (2), preferably continuously.

The process for the preparation of a block copolymer according to the invention advantageously uses for the first block at least one ethylenically unsaturated monomer of which one is used as main monomer and is chosen among styrene and its derivatives, acrylic acid and its derivatives, methacrylic acid and its derivatives, dienes, vinyl esters, vinyl ethers, vinyl derivatives of pyridine, vinylsulphonic acid and its derivatives, vinylphosphonic acid and its derivatives, N-vinyl monomers and halogenated vinyl monomers.

The expression at least one ethylenically unsaturated monomer of which one is used as main monomer means that the process of polymerization can use one or more ethylenically unsaturated monomers and that in the case of more than one monomer, one of them is the main monomer.

The expression main monomer means the monomer present in a proportion of at least $100/n$ % by weight of the monomeric mixture, and which will generate at least $100/n$ % by weight of the monomeric units of the polymer obtained, n being the number of monomers in the monomeric mixture.

According to a first variant of the process according to the invention, the ethylenically unsaturated monomer used as main monomer for the first block of the block copolymer is chosen among styrene and its derivatives, acrylic acid and its derivatives, methacrylic acid and its derivatives, dienes, vinyl esters, vinyl ethers, vinyl derivatives of pyridine, vinylsulphonic acid and its derivatives, vinylphosphonic acid and its derivatives and N-vinyl monomers.

Among the derivatives of styrene, mention may be made of para-tert-butylstyrene, para-methylstyrene, meta-methylstyrene, alpha-methylstyrene, para-bromostyrene, para-chlorostyrene, meta-(1-chloroethyl)styrene, para-fluorostyrene, para-trifluoromethylstyrene, meta-trifluoromethylstyrene, pentafluorostyrene, para-acetoxystyrene, para-methoxystyrene, para-tert-butoxystyrene, para-epoxystyrene, para-aminostyrene, the alkali metal salts of para-styrenesulphonic acid, vinylbenzoic acid, the alkali metal salts of vinylbenzoic acid, para-chloromethylstyrene, perfluorooctylethyleneoxymethyl-styrene, N,N-dimethylvinylbenzylamine, vinylbenzyltrimethylammonium chloride and 3-isopropenyl-alpha,alpha-dimethylbenzyl isocyanate. Particular preference is given to styrene.

The expression derivatives of acrylic acid means the salts of acrylic acid, e.g. the alkali metal salts, acrylic acid protected by a trimethylsilyl, tert-butyl, tetrahydropyranyl, 1-ethoxyethyl or benzyl group, alkyl acrylates, acrylonitrile, acrylamide and its derivatives.

Among the alkyl acrylates, mention may be made of methyl acrylate, ethyl acrylate, n-propyl acrylate, isopropyl acrylate, n-butyl acrylate, sec-butyl acrylate, isobutyl acrylate, tert-butyl acrylate, n-hexyl acrylate, 2-ethylhexyl acrylate, cyclohexyl acrylate, stearyl acrylate, glycidyl acrylate, benzyl acrylate, isobornyl acrylate, lauryl acrylate, hydroxyethyl acrylate, hydroxypropyl acrylate, 2-dimethylaminoethyl acrylate, 2-trimethylaminoethyl acrylate chloride, the potassium salt of 3-sulphopropyl acrylate, fluoroalkyl acrylates, e.g. 1,1,2,2-tetrahydroperfluorodecyl acrylate, allyl acrylate, vinyl acrylate, sugars and nucleosides, protected or unprotected, e.g. 2-beta-D-glucopyranosyloxyethyl acrylate, n-butyl alpha-fluoroacrylate, 2-(2-bromopropionyloxy)ethyl acrylate, 2-(2-bromoisobutyryloxy)ethyl acrylate, carboxyethyl acrylate, tetrahydropyranyl acrylate, 1-ethoxyethyl acrylate, and the acrylate macromonomers e.g. poly(ethylene oxide) acrylate and poly(dimethylsiloxane) acrylate. Particular preference is given to butyl acrylate and 2-ethylhexyl acrylate with a more particulate preference to n-butyl acrylate.

Among the derivatives of acrylamide, mention may be made of N,N-dimethylacrylamide, tert-butylacrylamide, N-hydroxymethylacrylamide, N-acetamidoacrylamide, N-methylolacrylamide, the methylether of N-methylolacrylamide, 2-acrylamido-2-methylpropane sulphonic acid (AMPS) or one of its salts, of sodium for example, sodium 3-acrylamido-3-methylbutanoate, and N-isopropylacrylamide.

The expression derivatives of methacrylic acid means the salts of methacrylic acid, e.g. the alkali metal salts, methacrylic acid protected by a trimethylsilyl, tert-butyl, tetrahydropyranyl, 1-ethoxyethyl or benzyl group, alkyl methacrylates, methacrylonitrile, methacrylamide and its derivatives.

Among the alkyl methacrylates, mention may be made of methyl methacrylate, ethyl methacrylate, n-propyl methacrylate, isopropyl methacrylate, n-butyl methacrylate, sec-butyl methacrylate, isobutyl methacrylate, tert-butyl methacrylate, n-hexyl methacrylate, 2-ethylhexyl methacrylate, cyclohexyl methacrylate, lauryl methacrylate, glycidyl methacrylate, benzyl methacrylate, isobornyl methacrylate, bornyl methacrylate, hydroxyethyl methacrylate, hydroxypropyl methacrylate, fluoroalkyl methacrylates, such as 1,1,2,2-tetrahydroperfluorodecyl methacrylate, allyl methacrylate, vinyl methacrylate, tetrahydropyranyl methacrylate, 2-(N-morpholino)ethyl methacrylate, 2-(dimethylamino)ethyl methacrylate, 2-trimethylaminoethyl methacrylate chloride, 2-aminoethyl methacrylate, dimethylaminopropyl methacrylate, 2-sulphoethyl methacrylate, the potassium salt of 3-sulphopropyl methacrylate, sugars and nucleosides, protected or unprotected, such as 5'-methacrylouridine, 2-(2-bromopropionyloxy)ethyl methacrylate, 2-(2-bromoisobutyryloxy) ethyl methacrylate, N,N-dimethyl-N-methacryloxyethyl-N-(3-sulphopropyl)-ammonium betaine, acetoacetoxyethyl methacrylate, carboxyethyl methacrylate, 1-ethoxyethyl methacrylate, and the methacrylate macromonomers, e.g. poly(ethylene oxide) methacrylate and poly(dimethylsiloxane) methacrylate. Particular preference is given to methyl methacrylate, butyl methacrylate and 2-ethylhexyl methacrylate.

Among the derivatives of methacrylamide, mention may be made of N,N-(2-hydroxypropyl)methacrylamide, [3-(methacryloylamino)propyl]trimethylammonium chloride and methacryloylaminopropyldimethylammonium sulphobetaine.

Among the diene monomers mention may be made of butadiene, isoprene, chloroprene and isobutene. Particular preference is given to butadiene and chloroprene.

Among the vinyl esters, mention may be made of vinyl acetate, vinyl trifluoroacetate, vinyl versatate, the vinyl ester of tert-decanoic acid (VeoVa10), the vinyl ester of neo-nonanoic acid (VeoVa9) and vinyl pivalate. Particular preference is given to vinyl acetate.

Among the vinyl ethers, mention may be made of methyl vinyl ether, ethyl vinyl ether, n-propyl vinyl ether, isopropyl vinyl ether, isobutyl vinyl ether, n-butyl vinyl ether, cyclohexyl vinyl ether, 2-methoxyethyl vinyl ether, 2-chloroethyl vinyl ether, 2-chloroethyl propenyl ether, 3-bromo-n-propyl vinyl ether, 4-chloro-n-butyl vinyl ether, 2-hydroxy ethyl vinyl ether, 4-hydroxy butyl vinyl ether, 6-hydroxyhexyl vinyl ether, 4-hydroxymethyl cyclohexylmethyl vinyl ether, triethylene glycol monovinyl ether, diethylene glycol monovinyl ether, n-butyldiethoxy vinyl ether, n-hexylethoxy vinyl ether, methyl dipropylene glycol vinyl ether, cyclohexanediethanol monovinyl ether and 2-ethyl-hexylethoxy vinyl ether.

Among the vinyl derivatives of pyridine, mention may be made of 4-vinyl-pyridine, 3-vinylpyridine, 2-vinylpyridine and 1-(3-sulphopropyl)-2-vinylpyridinium betaine.

Among the derivatives of vinylsulphonic acid and of vinylphosphonic acid, mention may be made of their salts and their esters.

Among the N-vinyl monomers, mention may be made of N-vinylcarbazole, N-vinylcarbamate, N-vinylcaprolactam, N-vinylpyrrolidinone and N-vinylimidazole.

According to this first variant, the ethylenically unsaturated monomer used as main monomer for the first block of the block copolymer is therefore chosen among styrene and its derivatives, acrylic acid and its derivatives, methacrylic acid and its derivatives, dienes, vinyl esters, vinyl ethers, vinyl derivatives of pyridine, vinylsulphonic acid and its derivatives, vinylphosphonic acid and its derivatives, N-vinylcarbazole, N-vinylcarbamate, N-vinylcaprolactam or N-vinylpyrrolidinone.

Further to the main monomer, one or more monomers copolymerizable therewith may be used for the preparation of the first block. Among the copolymerizable monomers, non-limiting mention may be made of the monomers listed above as main monomer, but also of monomers of the following type: maleimides, maleates, fumarates and allyl compounds, and also itaconic acid, crotonic acid, maleic anhydride and halogenated vinyl monomers as those defined in the context of this invention.

According to this first variant, the ethylenically unsaturated monomer used as main monomer for the first block of the block copolymer is more preferably chosen among styrene and its derivatives, acrylic acid and its derivatives, methacrylic acid and its derivatives, dienes, vinyl esters and vinyl ethers.

According to this first variant, the ethylenically unsaturated monomer used as main monomer for the first block of the block copolymer is most preferably chosen among styrene and its derivatives, acrylic acid and its derivatives and methacrylic acid and its derivatives.

According to this first variant, good results have been obtained when the ethylenically unsaturated monomer used as main monomer for the first block of the block copolymer is chosen among acrylic acid and its derivatives and methacrylic acid and its derivatives.

According to a second variant of the process according to the invention, the ethylenically unsaturated monomer used as main monomer for the first block of the block copolymer is chosen among halogenated vinyl monomers.

The halogenated vinyl monomers are advantageously chosen among chlorinated vinyl monomers and fluorinated vinyl monomers.

The expression fluorinated vinyl monomers means mono-ethylenically unsaturated fluorinated monomers which are aliphatic and whose only heteroatom(s) is/are one or more atoms of fluorine and, optionally moreover, one or more atoms of chlorine. Examples which may be mentioned of fluorinated vinyl monomers are chlorotrifluoroethylene, trifluoroethylene, 3,3,3-trifluoropropene, perfluorinated vinyl monomers e.g. tetrafluoroethylene and hexafluoropropylene, fluorinated vinyl monomers having no atoms of chlorine and whose number of atoms of fluorine is 1, for example allyl fluoride and vinyl fluoride, and also fluorinated vinyl monomers having no atoms of chlorine and whose number of atoms of fluorine is 2, very particularly vinylidene fluoride.

Shall the fluorinated monomer be free of hydrogen atom, it is designated as per(halo)fluoromonomer.

Non limitative examples of suitable per(halo)fluoromonomers are notably:

- $C_2$-$C_8$ perfluoroolefins, such as tetrafluoroethylene (TFE) and hexafluoropropene (HFP);
- chloro- and/or bromo- and/or iodo-$C_2$-$C_6$ per(halo)fluoroolefins, like chlorotrifluoroethylene;
- per(halo)fluoroalkylvinylethers complying with general formula $CF_2$=$CFOR_{f3}$ in which $R_{f3}$ is a $C_1$-$C_6$ per(halo)fluoroalkyl, such as —$CF_3$, —$C_2F_5$, —$C_3F_7$;
- per(halo)fluoro-oxyalkylvinylethers complying with general formula $CF_2$=$CFOX_{01}$, in which $X_{01}$ is a $C_1$-$C_{12}$ per(halo)fluorooxyalkyl having one or more ether groups, like perfluoro-2-propoxy-propyl group;
- per(halo)fluoro-methoxy-alkylvinylethers complying with general formula $CF_2$=$CFOCF_2OR_{f4}$ in which $R_{f4}$ is a $C_1$-$C_6$ per(halo)fluoroalkyl, such as —$CF_3$, —$C_2F_5$, —$C_3F_7$ or a $C_1$-$C_6$ per(halo)fluorooxyalkyl having one or more ether groups, such as —$C_2F_5$—O—$CF_3$;
- per(halo)fluorodioxoles.

Shall the fluorinated monomer comprise at least one hydrogen atom, it is designated as hydrogen-containing fluorinated monomer. Non limitative examples of suitable hydrogen-containing fluorinated monomer are vinylidene fluoride, trifluoroethylene and vinyl fluoride.

One or more monomers copolymerizable with the fluorinated monomer or the hydrogen-containing fluorinated monomer may be used for the preparation of the first block.

Hereinafter, the term comonomer (CM) should be intended to encompass both one comonomer and two or more comonomers. The comonomer (CM) can notably be either hydrogenated (i.e. free of fluorine atom) [comonomer (HCM), hereinafter] or fluorinated (i.e. containing at least one fluorine atom) [comonomer (FCM), hereinafter].

Non limitative examples of suitable hydrogenated comonomers (HCM) are notably ethylene, propylene, vinyl monomers such as vinyl acetate, acrylic monomers, like methyl methacrylate, acrylic acid, methacrylic acid and hydroxyethyl acrylate, as well as styrene monomers, like styrene and p-methylstyrene.

Non limitative examples of suitable fluorinated comonomers (FCM) are notably:

- $C_3$-$C_8$ fluoro- and/or perfluoroolefins, such as hexafluoropropene, pentafluoropropylene, and hexafluoroisobutylene;
- $C_2$-$C_8$ hydrogenated monofluoroolefins, such as vinyl fluoride;
- 1,2-difluoroethylene, vinylidene fluoride and trifluoroethylene;
- perfluoroalkylethylenes complying with formula $CH_2$=CH—$R_{f10}$, in which $R_{f10}$ is a $C_1$-$C_6$ perfluoroalkyl;
- chloro- and/or bromo- and/or iodo-$C_2$-$C_6$ fluoroolefins, like chlorotrifluoroethylene;
- fluoroalkylvinylethers complying with formula $CF_2$=$CFOR_{f1}$ in which $R_{f1}$ is a $C_1$-$C_6$ fluoro- or perfluoroalkyl, e.g. —$CF_3$, —$C_2F_5$, —$C_3F_7$;
- fluoro-oxyalkylvinylethers complying with formula $CF_2$=$CFOX_0$, in which $X_0$ is a $C_1$-$C_{12}$ oxyalkyl, or a $C_1$-$C_{12}$ (per)fluorooxyalkyl having one or more ether groups, like perfluoro-2-propoxy-propyl;
- fluoroalkyl-methoxy-vinylethers complying with formula $CF_2$=$CFOCF_2OR_{f2}$ in which $R_{f2}$ is a $C_1$-$C_6$ fluoro- or perfluoroalkyl, e.g. —$CF_3$, —$C_2F_5$, —$C_3F_7$ or a $C_1$-$C_6$ (per)fluorooxyalkyl having one or more ether groups, like —$C_2F_5$—O—$CF_3$;
- fluorodioxoles.

Preferably are used for the preparation of the first block,

- TFE; mixtures of TFE and/or CTFE with ethylene, propylene or isobutylene (preferably ethylene), with a molar ratio per(halo)fluoromonomer(s)/hydrogenated comonomer(s) of from 30:70 to 70:30, optionally containing one or more comonomers in amounts of from 0.1 to 30% by moles, based on the total amount of TFE and/or CTFE and hydrogenated comonomer(s);
- mixture of TFE with at least one per(halo)fluoromonomer chosen among the group of perfluoalkylvinylethers (in particular perfluoromethylvinylether, perfluoroethylevinylether, perfluoropropylvinylether and their mixtures) and/or per(halo)fluorodioxoles;
- vinylidene fluoride (VdF) or mixture of VdF with reduced amounts, generally comprised between 0.1 and 15% by moles, of one or more fluorinated comonomer(s) optionally further comprising one or more hydrogenated comonomer(s).

The expression chlorinated vinyl monomers means monoethylenically unsaturated chlorinated monomers which are aliphatic and which have one or more atoms of chlorine as their only heteroatom(s). Examples which may be mentioned of chlorinated vinyl monomers are chlorinated vinyl monomers whose number of atoms of chlorine is 1, chlorinated vinyl monomers whose number of atoms of chlorine is 2, trichloroethylene, 1,1,3-trichloropropene and tetrachloroethylene.

A first preferred family of chlorinated vinyl monomers consists of chlorinated vinyl monomers whose number of atoms of chlorine is 1. Examples which may be mentioned of chlorinated vinyl monomers whose number of atoms of chlorine is 1 are allyl chloride, crotyl chloride and, very particularly, vinyl chloride. One or more monomers copolymerizable therewith may be used for the preparation of the first block. Among the monomers copolymerizable with vinyl chloride, non-limiting mention may be made of styrene monomers such as styrene, (meth)acrylic monomers, such as n-butyl acrylate and methyl methacrylate, vinyl esters such as vinyl acetate and olefinic monomers such as ethylene, propylene and butadiene. Particular preference is given to vinyl acetate. Preferably, vinyl chloride is the only monomer used for the preparation of the first block.

A second preferred family of chlorinated vinyl monomers consists of the chlorinated vinyl monomers whose number of atoms of chlorine is 2. Examples which may be mentioned of chlorinated vinyl monomers whose number of atoms of chlorine is 2 are 1,1-dichloropropene, 1,3-dichloropropene, 2,3-dichloropropene and, very particularly, vinylidene chloride. One or more monomers copolymerizable therewith may be used for the preparation of the first block.

Among the monomers copolymerizable with vinylidene chloride, non-limiting mention may be made of vinyl chloride, vinyl esters, e.g. vinyl acetate, vinyl ethers, acrylic acids, esters and amides, methacrylic acids, esters and amides, acrylonitrile, methacrylonitrile, styrene, styrene derivatives, butadiene, olefins, e.g. ethylene and propylene, itaconic acid and maleic anhydride, but also copolymerizable surfactants, such as 2-acrylamido-2-methylpropane sulphonic acid (AMPS) or one of its salts, of sodium for example, and the acid 2-sulphoethyl methacrylate (2-SEM) or one of its salts, of sodium for example.

Preferred monomers copolymerizable with vinylidene chloride are vinyl chloride and/or at least one monomer chosen among maleic anhydride, itaconic acid and (meth)acrylic monomers of the general formula:

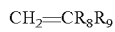

$$CH_2=CR_8R_9$$

in which $R_8$ is chosen among hydrogen and the methyl radical and $R_9$ is chosen among the radical —CN and the radical —CO—$R_{10}$ in which $R_{10}$ is chosen among the radical —OH, the radicals —O—$R_{11}$ where $R_{11}$ is chosen among linear or branched alkyl radicals containing from 1 to 18 atoms of carbon optionally bearing one or more —OH radicals, epoxyalkyl radicals containing from 2 to 10 atoms of carbon and alkoxyalkyl radicals containing a total of from 2 to 10 atoms of carbon and finally $R_{10}$ is also chosen among the —$NR_{12}R_{13}$ radicals in which $R_{12}$ and $R_{13}$, identical or different, are chosen among hydrogen and the alkyl radicals containing from 1 to 10 atoms of carbon, optionally bearing one or more —OH radicals.

Particularly preferred monomers copolymerizable with vinylidene chloride are vinyl chloride and/or at least one monomer chosen among maleic anhydride, itaconic acid, and (meth)acrylic monomers represented by methyl acrylate, methyl methacrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide and N-methylolacrylamide.

According to the second variant of the process according to the invention, the ethylenically unsaturated monomer used as main monomer for the first block of the block copolymer is preferably chosen among the chlorinated vinyl monomers, more preferably among the chlorinated vinyl monomers whose number of atoms of chlorine is 2. According to this second variant, the ethylenically unsaturated monomer used as main monomer for the first block of the block copolymer is most preferably vinylidene chloride.

Preferably, one or more monomers copolymerizable therewith is (are) used for the preparation of the first block. More preferably, a mixture of vinylidene chloride and monomer(s) copolymerizable therewith is used for the preparation of the first block so that the first block contains at least 50% by weight of vinylidene chloride.

The amount of vinylidene chloride in the first block advantageously varies from 50 to 95% by weight, preferably from 60 to 95% by weight and particularly preferably from 70 to 95% by weight of the first block.

The amount of vinyl chloride in the first block advantageously varies from 0.5 to 50% by weight, preferably from 0.5 to 40% by weight, particularly preferably from 0.5 to 30% by weight of the first block.

The amount of itaconic acid and/or of (meth)acrylic monomer(s) in the first block advantageously varies from 1 to 50% by weight, preferably from 2 to 40% by weight, particularly preferably from 2 to 30% by weight of the first block.

The manner of introduction of the ethylenically unsaturated monomer(s) (A) for the synthesis of the first block of the block copolymer can be variable.

Therefore, in the case where (A) consists of a single ethylenically unsaturated monomer, the entirety of the monomer can be introduced in step (1) or a fraction thereof can be introduced in step (1) and the balance in step (2). The introduction in step (2) preferably takes place continuously.

In the case where (A) consists of at least two ethylenically unsaturated monomers, one portion of the monomers can be introduced in step (1) and the other portion in step (2), preferably continuously.

In the particular case where (A) consists of a mixture of at least two ethylenically unsaturated monomers, the entirety of the mixture can be introduced in step (1) or a fraction of the mixture can be introduced in step (1) and the balance of the same mixture can be introduced in step (2), preferably continuously.

For reacting the contents of the reactor according to step (2), means of internal generation of free radicals are used. To this end, in particular the contents can be heated or exposed to intensive light radiation.

The temperature at which the contents of the reactor are reacted is advantageously at least 30° C. and preferably at least 40° C. It is advantageously moreover at most 200° C. and preferably at most 120° C.

Step (2) is advantageously continued until the ethylenically unsaturated monomer(s) has/have reacted within certain limits. Step (2) is continued until the degree of conversion of the ethylenically unsaturated monomer(s) is preferably at least 82%. Step (2) is continued until the degree of conversion of the ethylenically unsaturated monomer(s) is preferably at most 100%.

According to step (3), an aqueous dispersion comprising the polymer constituting the first block of the block copolymer is obtained. An optional step (4) may moreover take place, in the course of which the reaction is terminated by introducing a chemical agent capable of decomposing the excess free-radical generator and/or by extracting the fraction of (A) which has not reacted, these being operations which can be implemented simultaneously or in succession, in the reactor or outside the reactor.

When the fraction of (A) which has not reacted has sufficient volatility, it is advantageously extracted from the contents of the reactor by applying a vacuum to the contents and/or by steam distillation.

An optional step (5) may optionally take place after step (4) according to which the polymer is isolated from the aqueous dispersion obtained in step (3).

Techniques which can be used, other than the monomer-removal treatment previously discussed above, to isolate the polymer from the contents of the reactor are any of the separation techniques known to the person skilled in the art, particularly centrifuging and drying in a fluidized bed (in particular when the polymer has been produced by a process in suspension) and drying by atomization or by coagulation (in particular when the polymer has been produced by a process in emulsion or in mini-emulsion). These operations are advantageously implemented outside the reactor.

Preferably, step (4) and (5) do not take place and the aqueous dispersion obtained in step (3) is used as such.

The polymer constituting the first block of the block copolymer obtained in step (3) of the preparation of the first block of the block copolymer is afterwards advantageously further polymerized by free-radical polymerization in aqueous dispersion in order to add a second block to the block copolymer.

The process according to the invention is therefore preferably characterized by the fact that the second block of the block copolymer is prepared using (p) the polymer constituting the first block of the block copolymer obtained in step (3) hereabove, (a) at least one ethylenically unsaturated monomer of which one is used as main monomer and is chosen among styrene and its derivatives, acrylic acid and its derivatives, methacrylic acid and its derivatives, dienes, vinyl esters, vinyl ethers, vinyl derivatives of pyridine, vinylsulphonic acid and its derivatives, vinylphosphonic acid and its derivatives, N-vinyl monomers and halogenated vinyl monomers, (b) possibly at least one free-radical generator chosen among diazo compounds, peroxides and dialkyldiphenylalkanes, (d) possibly at least one oxidant whose solubility in water is at least 10 g/l, at least one of which can be one of (b);

which comprises steps according to which (1') (p) and at least one fraction of each of the compounds (a), (b) and (d) are introduced into a reactor;

(2') the contents of the reactor are reacted while introducing any balance of each of the compounds (a), (b) and (d) therein; and (3') an aqueous dispersion comprising the block copolymer with two blocks is obtained.

What is meant by aqueous dispersion, polymerization in aqueous dispersion, dispersing agents, emulsifying agents, hydrophobic agents, is defined in the first part of the patent application in relation with the synthesis of the first block of the block copolymer.

The polymer (p) constituting the first block of the block copolymer obtained in step (3) of the synthesis of the first block of the block copolymer may be used after being isolated from the aqueous dispersion obtained in step (3) or not. Preferably, the polymer (p) is used in the form of the aqueous dispersion obtained in step (3).

The second block of the block copolymer is prepared in the presence of at least one free-radical generator chosen among diazo compounds, peroxides and dialkyldiphenylalkanes or not. Preferably, it is prepared in the presence of at least one free-radical generator.

The definitions, examples and preferences developed for the free-radical generator (B) in the synthesis of the first block of the block copolymer apply for the free-radical generator (b) used in the synthesis of the second block of the block copolymer. The free-radical generator(s) (b) used for the synthesis of the second block of the block copolymer may be identical or different from the free-radical generator(s) (B) used for the synthesis of the first block of the block copolymer.

The manner of introduction of the free-radical generator(s) (b) into the process according to the invention can be variable.

Therefore, in the case where (b) consists of a single free-radical generator, the entirety of the free-radical generator can be introduced in step (1') or a fraction thereof can be introduced in step (1') and the balance in step (2'). The introduction in step (2') preferably takes place continuously.

In the case where (b) consists of at least two free-radical generators, one portion of the free-radical generators can be introduced in step (1') and the other portion in step (2'), preferably continuously.

In the particular case where (b) consists of a mixture of at least two free-radical generators, the entirety of the mixture can be introduced in step (1') or a fraction of the mixture can be introduced in step (1') and the balance of the same mixture in step (2'), preferably continuously.

The second block of the block copolymer is advantageously prepared in the absence of molecular iodine.

The second block of the block copolymer may be prepared in the presence of at least one oxidant whose solubility in water is at least 10 µl, at least one of which can be one of (b), or not. Preferably, it is prepared in the presence of at least one oxidant.

The definitions, examples and preferences developed for the oxidant (D) in the synthesis of the first block of the block copolymer apply for the synthesis of the second block of the block copolymer. The oxidant (d) used for the synthesis of the second block of the block copolymer may be identical or different from the oxidant (D) used for the synthesis of the first block of the block copolymer.

The manner of introduction of the oxidant(s) (d) into the process according to the invention can be variable. The entirety of (d) can be introduced in step (1') or a fraction thereof can be introduced in step (1') and the balance in step (2'). The introduction preferably takes place continuously. The introduction in step (2') preferably takes place continuously.

The entirety of (d) is preferably introduced into the reactor between the start of step (1') and the time of step (2') when the degree of conversion reaches 70%.

The synthesis of the second block of the block copolymer may be made in aqueous suspension, in aqueous microsuspenion, in aqueous emulsion or mini-emulsion as defined for the synthesis of the first block of the block copolymer. The definitions, examples and preferences are the same as those previously described.

In the case a surfactant is used, when it consists of a single surfactant, the entirety of it can be introduced in step (1') or a fraction thereof can be introduced in step (1') and the balance in step (2'). The introduction in step (2') preferably takes place continuously.

In the case where at least two surfactants are used, one portion of the surfactants can be introduced in step (1') and the other portion in step (2'), preferably continuously.

In the particular case where a mixture of at least two surfactants is used, the entirety of the mixture can be introduced in step (1') or a fraction of the mixture can be introduced in step (1') and the balance of the same mixture in step (2'), preferably continuously.

The process for the preparation of a block copolymer according to the invention advantageously uses for the second block at least one ethylenically unsaturated monomer of which one is used as main monomer and is chosen among styrene and its derivatives, acrylic acid and its derivatives, methacrylic acid and its derivatives, dienes, vinyl esters, vinyl ethers, vinyl derivatives of pyridine, vinylsulphonic acid and its derivatives, vinylphosphonic acid and its derivatives, N-vinyl monomers and halogenated vinyl monomers.

The definitions, examples and preferences developed for the monomer(s) (A) in the synthesis of the first block of the block copolymer apply for the monomer(s) (a) in the synthesis of the second block of the block copolymer.

The manner of introduction of the ethylenically unsaturated monomer(s) (a) for the synthesis of the second block of the block copolymer can be variable.

Therefore, in the case where (a) consists of a single ethylenically unsaturated monomer, the entirety of the monomer can be introduced in step (1') or a fraction thereof can be introduced in step (1') and the balance in step (2'). The introduction in step (2') preferably takes place continuously.

In the case where (a) consists of at least two ethylenically unsaturated monomers, one portion of the monomers can be introduced in step (1') and the other portion in step (2'), preferably continuously.

In the particular case where (a) consists of a mixture of at least two ethylenically unsaturated monomers, the entirety of the mixture can be introduced in step (1') or a fraction of the mixture can be introduced in step (1') and the balance of the same mixture can be introduced in step (2'), preferably continuously.

For reacting the contents of the reactor according to step (2'), means of internal generation of free radicals are used. To this end, in particular the contents can be heated or exposed to intensive light radiation.

The temperature at which the contents of the reactor are reacted is advantageously at least 30° C. and preferably at least 40° C. It is advantageously moreover at most 200° C. and preferably at most 120° C.

Step (2') is advantageously continued until the ethylenically unsaturated monomer(s) has/have reacted within certain limits. Step (2') is continued until the degree of conversion of the ethylenically unsaturated monomer(s) is preferably at least 60%. Step (2') is continued until the degree of conversion of the ethylenically unsaturated monomer(s) is preferably at most 100%.

According to step (3'), an aqueous dispersion comprising the block copolymer with two block is obtained. An optional step (4') may moreover take place, in the course of which the reaction is terminated by introducing a chemical agent capable of decomposing the excess free-radical generator and/or by extracting the fraction of (a) which has not reacted, these being operations which can be implemented simultaneously or in succession, in the reactor or outside the reactor.

When the fraction of (a) which has not reacted has sufficient volatility, it is advantageously extracted from the contents of the reactor by applying a vacuum to the contents and/or by steam distillation.

An optional step (5') may optionally take place after step (4') according to which the block copolymer is isolated from the aqueous dispersion obtained in step (3').

Techniques which can be used, other than the monomer-removal treatment previously discussed above, to isolate the block copolymer from the contents of the reactor are any of the separation techniques known to the person skilled in the art, particularly centrifuging and drying in a fluidized bed (in particular when the polymer has been produced by a process in suspension) and drying by atomization or by coagulation (in particular when the polymer has been produced by a process in emulsion or in mini-emulsion). These operations are advantageously implemented outside the reactor.

Preferably, step (4') and (5') do not take place and the aqueous dispersion obtained in step (3') is used as such if a further block is added to the two block copolymer. If however, the block copolymer is a two block copolymer, then step (4') and (5') preferably take place so that the two block copolymer may be isolated.

If a three block or more than three block copolymer is wished, the two block copolymer obtained in step (3') may further be polymerized by free-radical polymerization in aqueous dispersion as described previously for the two block copolymer.

The process of controlled free-radical polymerization in aqueous dispersion according to the invention is preferably a process for the preparation of a block copolymer the first block of which is prepared using (A) at least one ethylenically unsaturated monomer of which one is used as main monomer and is chosen among styrene and its derivatives, acrylic acid and its derivatives, methacrylic acid and its derivatives, dienes, vinyl esters, vinyl ethers, vinyl derivatives of pyridine, vinylsulphonic acid and its derivatives, vinylphosphonic acid and its derivatives and N-vinyl monomers and the second block of which is prepared using (a) at least one ethylenically unsaturated monomer of which one is used as main monomer and chosen among halogenated vinyl monomers.

The preferences defined here above for the monomers apply also for the preferred process according to the invention.

A more preferred process is one in which (A) is at least one ethylenically unsaturated monomer of which one is used as main monomer and chosen among styrene and its derivatives, acrylic acid and its derivatives and methacrylic acid and its derivatives and the main monomer used for the second block (a) is vinylidene chloride.

In the case of the preferred process, the ratio in weight between the first block and the second block of the copolymer is advantageously at least 0.1. This ratio is advantageously at most 1.

The process of free-radical polymerization in aqueous dispersion for the preparation of a block copolymer according to the invention provides numerous advantages.

It is characterized by a distinct controlled character, despite using well-known monomers having intrinsic susceptibility towards transfer of free-radical activity from growing polymer chains onto the monomers themselves (transfer-onto-monomer reactions) and/or onto non-living polymer chains (transfer-onto-polymer reactions).

When comparison is made with the standard process described in the prior art and using iodine as control agent, the process according to the invention makes it possible to improve control of number-average (or weight-average) molecular weight of the copolymer prepared in aqueous dispersion, and also possibly their polydispersity. It is therefore worthy to note that the difference between the theoretical molecular weight and the experimental molecular weight is markedly lower than in the case of the prior process.

Another very significant advantage of the process of free-radical polymerization for the preparation of block copolymers according to the invention is that the growth of the polymer chains prepared in aqueous dispersion can be re-started by undertaking a further reaction of the polymers with ethylenically unsaturated monomers identical with or different from those which had been polymerized previously. By contrast, according to the "traditional" process of free-radical polymerization, it is usually not possible to synthesize block copolymers of this type.

Another advantage of the process of free-radical polymerization according to the invention is that it does not need to use starting materials which are usually expensive, unstable, difficult to prepare and to handle e.g. iodinated organic chain-transfer agents.

A final advantage specific to the first subvariant of the first particularly preferred variant of the second embodiment is that it is very highly suitable for industrial operation in terms of cost economics and health and safety at work, in particular for the preparation of block copolymers with one block the main monomer of which being vinylidene chloride.

The examples which follow have the purpose of illustrating the invention, without limiting its scope.

Determination of Monomer Conversion

The degree of monomer conversion was determined by gravimetric analysis in an aluminium dish. For this, a known amount of the aqueous dispersion was weighed out. One grain of inhibitor was then added to this to stop the polymerization, and the water and the residual monomer were evaporated from the material. The dry extract of polymer was recovered after drying in vacuo at 40° C. and the degree of conversion was calculated according to the following equation: $(E_{sf}-E_{so})/(E_{sth}-E_{so})$ in which $E_{sf}$ is final dry extract, $E_{so}$ is initial extract and $E_{sth}$ is theoretical final dry extract at 100% conversion.

Determination of Molecular Weights

Intended molecular weight ($M_{n,intended}$), for 100% conversion, was determined by applying the formula according to equation (1), i.e.

$$M_{n,intended} = (\text{weight of monomer})/(2 \times n_{I2,initial}) + M_{A\text{-}I} \quad \text{(equation 1)}$$

according to which $n_{I2,initial}$ is the number of initial moles of molecular iodine and $M_{A\text{-}I}$ is the molecular weight of the chain ends (A being the chain end deriving from the free-radical generator and I being the atom of iodine).

Theoretical molecular weight ($M_{n,th}$) was determined by considering conversion according to $M_{n,th}=(\text{weight of monomer}) \times (\text{monomer conversion})/(2 \times n_{I2,initial}) + M_{A\text{-}I}$.

Experimental molecular weight ($M_{n,exp}$) was determined by steric exclusion chromatography on dry specimens dissolved in tetrahydrofuran by means of a Spectra Physics Instruments SP8810 pump equipped with a Shodex RIse-61 refractometric detector, with a Milton Roy Ultra-Violet spectrometric detector and with two 300 mm columns temperature-controlled to 30° C. (Polymer Laboratories 5 µm mixed-C PL-gel columns—molar mass range: $2 \times 10^2$-$2 \times 10^6$ g·mol$^{-1}$). Tetrahydrofuran was used as eluent at a flow rate of 1 ml·min$^{-1}$. Calibration was carried out by means of Polymer Laboratories polystyrene standards. The weights are those of the polystyrene equivalents.

The polydispersity index $PDI=M_w/M_n$ is the ratio of the weight-average molecular weight to the number-average molecular weight determined by steric exclusion chromatography.

Determination of Average Diameter

The average diameter of the particles of the aqueous dispersion ($d_p$) was determined by means of a Nanotrac Particle Size Analyzer 250 (Microtrac Inc.) particle analyser based on back-scattering of light and the Doppler effect for examples 1 to 3.

The average diameter of the particles of the aqueous dispersion ($d_p$) was determined by means of a Zetamaster V1-26 particle analyser (Malvern) based on back-scattering of light for examples 4 to 6.

Determination of Dry Matter Content

The determination of the aqueous dispersion dry matter content was done using a Mettler Toledo HR 73 Halogen moisture analyser. A determined amount (Mi around 3 g) of the sample was dispersed on a paper filter in an aluminium capsule. The sample was heated at 120° C. until stabilisation of the weight (Mf). The dry matter content of the sample DM was the ratio Mf/Mi*100.

Determination of the Surface Tension

The surface tension of the aqueous dispersion was determined at 20° C. using a Digital Tensiometer K10 (Kruss) with a plate. The aqueous dispersion was stabilised at the measuring temperature. Then the plate was immersed in the aqueous dispersion and the surface tension was measured by the apparatus during pulling off the plate out of the aqueous dispersion.

Determination of the Minimum Film Forming Temperature (MFFT)

The minimum film forming temperature of the aqueous dispersion was determined using a MFFT-Bar 60 device from Rhopoint. The aqueous dispersion was deposited over the surface that was regulated with a temperature gradient along it. The aqueous dispersion was then dried under a nitrogen flow resulting in drying at different temperature along the apparatus. The MFFT was determined as the temperature at which the aqueous dispersion starts to form a transparent and cohesive film upon drying.

Determination of Mechanical Stability

The mechanical stability of the aqueous dispersion was determined using a device composed of a rotor and a stator, causing a high mechanical shearing of the aqueous dispersion during rotation. During this treatment, the shearing causes destabilisation of the aqueous dispersion which results in coagulation and increase in power consumption. The mechanical stability was determined as the duration necessary to obtain a determined increase of power consumption.

Test of the Adhesion

The aqueous dispersion was coated using a bar coater over a polyethylene terephtalate (PET) film, then dried at 40° C. resulting in a PET film coated with a film of the polymer comprised in the dispersion. The film of the polymer comprised in the dispersion was then slightly cut using a blade. A piece of tape was then put over the cut place, perpendicularly to the cut and was then pulled off manually. In the case of a good adhesion between PET film and the film of the polymer comprised in the dispersion, after pulling, the film of the polymer comprised in the dispersion remained on the PET substrate. In the case of a low adhesion, the film of the polymer comprised in the dispersion remained on the surface of the tape. The test was repeated 5 times to assess a good reproducibility.

Materials Used

Methyl acrylate (MA, Aldrich, 99%), vinylidene chloride (VDC, Fluka, 99.5%) and n-butyl acrylate (BuA, Aldrich, 99%) were purified by distillation in vacuo before use.

Iodine ($I_2$, Aldrich, 99.8%), sodium 1-hexadecanesulphonate (Lancaster, 99%) and potassium persulphate (KPS, Aldrich, 99%) were used as received. Water was deionized by passage through ion-exchange columns.

Mersolat H40 (sodium alcanesulphonate, LANXESS), Ammonium persulphate ($NH_4PS$, Europeroxydes>99%) and sodium metabisulphite (PRODECHIM>95%) were used as received.

EXAMPLE 1 (according to the invention)

110 g of water were placed in a 250 ml glass reactor and thoroughly purged with argon for 30 minutes. A solution of sodium 1-hexadecanesulphonate (0.308 g, M=328.49 g·mol$^{-1}$, 0.0938 mmol) in water (10 g) was added to the reactor under a stream of argon, and was followed by a solution of $I_2$ (0.1912 g, M=253.81 g·mol$^{-1}$, 0.753 mmol) in BuA (15 g, M=128 g·mol$^{-1}$, 117 mmol). Finally, a solution of KPS (0.912 g, M=270.31 g·mol$^{-1}$, 3.37 mmol) in 30 g of water was added. The temperature of the reaction medium was then controlled to 85° C. with stirring at 250 rpm and the polymerization was conducted under argon with exclusion of light for 7 hours.

The molar [KPS]/[I2] ratio, the intended molecular weight ($M_{n,intended}$), the polymerization time, the degree of conversion, the theoretical molecular weight ($M_{n,th}$), the experimental molecular weight ($M_{n,exp}$), the polydispersity index (PDI) and the average diameter of the particles of the aqueous dispersion ($d_p$) are given in Table 1.

EXAMPLE 2 (according to the invention)

Example 1 has been repeated a second time with exactly the same conditions except the reaction duration that was increased to 8.5 h, in order to control the reproducibility of the experiment. The obtained data are also given in table 1.

TABLE 1

| Ex | [KPS]/[I$_2$] (molar) | M$_{n,intended}$ (g·mol$^{-1}$) | Time (h) | Conv. (%) | M$_{n,th}$ (g·mol$^{-1}$) | M$_{n,exp}$ (g·mol$^{-1}$) | PDI | d$_p$ (nm) |
|---|---|---|---|---|---|---|---|---|
| 1 | 4.5 | 10000 | 7 | 90 | 9000 | 7400 | 1.79 | 304 |
| 2 | 4.5 | 10000 | 8.5 | 99 | 9900 | 8700 | 1.85 | 311 |

The ratio between experimental molecular weight (M$_{n,exp}$) and theoretical molecular weight (M$_{n,th}$) are respectively of 0.82 and 0.87 i.e. very near of 1, attesting of a very good control.

EXAMPLE 3 (according to the invention)

A polyBuA-b-[polyMA-VDC] block copolymer was prepared with the seeding dispersion prepared in example 1.

For this, 180 ml of deionised water, 0.081 g of KPS and 59.89 g (3.08 g of polymer with a mass of 7400 g/mol) of the aqueous dispersion obtained in Example 1 were introduced into a 300 ml stainless steel reactor and purged by bubbling argon for 20 minutes. A mixture composed of 4.9 g of VDC and 1.1 g of MA was then introduced in the reactor and the agitation was started at 250 rpm. Heating of the reactor at the temperature of 85° C. was then started. After reaching the polymerisation temperature, a solution of Mersolat H40 (0.15 g in 5 g of water) was injected in the reactor for 30 minutes. The temperature was maintained for 8 hours and then the autoclave was degassed.

The polymerization time, the degree of conversion, the theoretical molecular weight (M$_{n,th}$), the experimental molecular weight (M$_{n,exp}$) and the polydispersity index (PDI) and the average diameter of the particles of the aqueous dispersion (d$_p$), are given in Table 2.

The theoretical molecular weight (M$_{n,th}$) was calculated using the equation $$M_{n,th} = M_{n,first\ block} + [(\text{weight of monomers}) \times \text{degree of conversion}/(\text{number of moles of polyBuA-I})] = 7400 + (4.9+1.1)*0.68/(3.08/7400) = 7400 + 9800 = 17200\ \text{g/mol}$$

Good correlation was found between the theoretical molecular weight (taking into account the conversion in terms of monomers in the second block) and the experimental molecular weight, a sign of the living character of the polyBuA obtained in Example 1.

TABLE 2

| Ex | Time (h) | Conv. (%) | M$_{n,th}$ (g·mol$^{-1}$) | M$_{n,exp}$ (g·mol$^{-1}$) | PDI | d$_p$ (nm) |
|---|---|---|---|---|---|---|
| 3 | 8 | 68 | 17200 | 14450 | 3.29 | 407 |

The ratio between experimental molecular weight (M$_{n,exp}$) and theoretical molecular weight (M$_{n,th}$) is of 0.84 i.e. very near of 1, attesting of a very good control.

EXAMPLE 4 (according to the invention)

1700 cm$^3$ of water were placed in a 3 l enameled reactor with 300 cm$^3$ of a solution of the emulsifying agent Mersolat MH40 at 2.19 g/l and the agitation was started at 100 rpm. A first vacuum of 140 mbar was operated followed by purging with nitrogen and then a second vacuum of 140 mbar was maintained. The agitation speed was maintained at 100 rpm. 360 g of BuA in which were previously solubilised 4.51 g of I$_2$ were then introduced in the reactor by aspiration. The reactor was then heated in order to reach 85° C., temperature which was maintained during all the polymerization. 100 cm$^3$ of a solution of NH$_4$PS at 187.8 g/l were then introduced in the reactor. This introduction corresponded to the starting point of the polymerization (time t0). At t0+2 h 30 min was started for 2 hours, an injection of a solution of the emulsifying agent Mersolat at 56.9 g/l with a rate of 50 cm$^3$/h. At t0+5 h, the reaction was stopped. The non reacted monomers were then flashed and degassed, and then a stripping was operated for 1 hour under vacuum at 65° C.

The polymerization time, the degree of conversion, the dry matter content, the intended molecular weight (M$_{n,intended}$), the theoretical molecular weight (M$_{n,th}$), the experimental molecular weight (M$_{n,exp}$), the polydispersity index (PDI) and the average diameter of the particles of the aqueous dispersion (d$_p$) are given in Table 3.

TABLE 3

| Ex | Time (h) | Conv. (%) | Dry matter content (%) | M$_{n,intended}$ (g·mol$^{-1}$) | M$_{n,th}$ (g·mol$^{-1}$) | M$_{n,exp}$ (g·mol$^{-1}$) | PDI | d$_p$ (nm) |
|---|---|---|---|---|---|---|---|---|
| 4 | 5 | 92.1 | 12.3 | 10400 | 9500 | 8969 | 2.01 | 167 |

The ratio between experimental molecular weight (M$_{n,exp}$) and theoretical molecular weight (M$_{n,th}$) is of 0.94 i.e. very near of 1, attesting of a very good control.

EXAMPLE 5 (according to the invention)

1620 g (ie 200 g of polymer with a mass of 8969 g/mol) of the aqueous dispersion prepared in example 4 were introduced into a 3 l enameled reactor with 20 cm$^3$ of a solution of emulsifying agent Mersolat MH40 at 26.55 g/l and the agitation was started at 150 rpm. A first vacuum of 140 mbar was operated followed by purging with nitrogen and then a second vacuum of 140 mbar was maintained. The agitation speed was increased to 200 rpm. A mixture of monomers containing 700 g of VDC and 100 g of MA was then introduced in the reactor by aspiration. The reactor was then heated in order to reach 65° C., temperature which was maintained during all the polymerization. 50 cm$^3$ of a solution of NH$_4$PS at 81.2 g/l were then introduced in the reactor. This introduction corresponded to the starting point of the polymerization (time t0). A solution of the emulsifying agent Mersolat H40 at 144.5 g/l was then introduced during 5 hours at a rate of 20 cm$^3$/h. After 6 hours, the polymerization was finished as shown by the pressure decrease in the reactor. The non reacted monomers were then flashed and degassed, and then a stripping was operated for 1 hour under vacuum at 65° C.

The polymerization time, the degree of conversion, the dry matter content, the theoretical molecular weight ($M_{n,th}$), the experimental molecular weight ($M_{n,exp}$), the polydispersity index (PDI) and the average diameter of the particles of the aqueous dispersion ($d_p$) are given in Table 4.

The surface tension of the obtained aqueous dispersion, measured as detailed above was of 29 mN/m, the mechanical stability was of 185 min and the minimum film forming temperature was less than 5° C. (limit of the measuring device). The adhesion on PET film was excellent, no delamination between the block copolymer film and the PET film was observed.

TABLE 4

| Ex | Time (h) | Conv. (%) | Dry matter content (%) | $M_{n,th}$ (g·mol$^{-1}$) | $M_{n,exp}$ (g·mol$^{-1}$) | PDI | $d_p$ (nm) |
|---|---|---|---|---|---|---|---|
| 5 | 6 | 98.7 | 38.4 | 44380 | 43000 | 2.48 | 254 |

The ratio between experimental molecular weight ($M_{n,exp}$) and theoretical molecular weight ($M_{n,th}$) is of 0.97 i.e. very near of 1, attesting of a very good control.

EXAMPLE 6 (comparative example)

650 cm³ of water were placed in a 3 l stainless steel reactor with 1.752 g of a solution of the emulsifying agent Mersolat MH40 at 40% and the agitation was started at 200 rpm. A first vacuum of 140 mbar was operated followed by purging with nitrogen and then a second vacuum of 140 mbar was maintained. The agitation speed was increased to 250 rpm. A mixture of monomers containing 875 g of VDC, 250 g of BuA and 125 g of MA was then introduced in the reactor by vacuum. The reactor was then heated in order to reach 65° C., temperature which was maintained during all the polymerization. Were then injected successively in the reactor, 100 cm³ of a solution of sodium metabisulfite at 3.75 g/l and 50 cm³ of a solution of NH$_4$PS at 0.5 g/l. This introduction corresponded to the starting point of the polymerization (time t0). A solution containing the emulsifying agent Mersolat H40 at 38.3 g/l and the NH$_4$PS at 0.125 g/l was then introduced during 6 hours at a rate of 100 cm³/h. After 6 hours, the polymerization was finished as shown by the pressure decrease in the reactor. The non reacted monomers were then flashed and degassed, and then a stripping was operated for 1 hour under vacuum at 65° C.

The polymerization time, the degree of conversion, the dry matter content, the experimental molecular weight ($M_{n,exp}$), the polydispersity index (PDI) and the average diameter of the particles of the aqueous dispersion ($d_p$) are given in Table 5.

The surface tension of the obtained aqueous dispersion, measured as detailed above was of 43 mN/m, the mechanical stability was of 117 min and the minimum film forming temperature of 11.7° C. There was no adhesion of the random copolymer on the PET film, as a delamination was observed for all of the samples.

TABLE 5

| Ex | Time (h) | Conv. (%) | Dry matter content (%) | $M_{n,exp}$ (g·mol$^{-1}$) | PDI | $d_p$ (nm) |
|---|---|---|---|---|---|---|
| 6 | 6 | 95 | 45.8 | 145000 | 2.63 | 171 |

The comparative example 6, characterized by the same composition as the block copolymer of example 5 (VDC/MA/BuA 70/10/20 by weight), was polymerized by a classical non controlled emulsion process and resulted in a random distribution of the monomers. The non controlled process resulted in higher molecular weight. The most significant differences that illustrate the difference in chain structures are the film forming temperature and adhesion. In the case of the block copolymer (example 5), the low glass transition temperature of the polybutylacrylate block causes the low temperature film coalescence of the polymer particles while in the random copolymer of example 6, the low Tg monomer being dispersed along the chain, results in a small film forming temperature depression. In the same way, the polybutylacrylate block insures the adhesion of the block copolymer film on the PET film by acting as a glue.

The invention claimed is:

1. A process of controlled free-radical polymerization in aqueous dispersion for the preparation of a block copolymer at least one block of which is a block of a halogenated polymer, the process comprising synthesizing a first block of the block copolymer in an aqueous dispersion in the presence of molecular iodine and at least one oxidant whose solubility in water is at least 10 g/l.

2. The process according to claim 1, wherein the first block of the block copolymer is synthesized using
   (A) at least one ethylenically unsaturated monomer of which one is used as main monomer and is selected from the group consisting of styrene and its derivatives, acrylic acid and its derivatives, methacrylic acid and its derivatives, dienes, vinyl esters, vinyl ethers, vinyl derivatives of pyridine, vinylsulphonic acid and its derivatives, vinylphosphonic acid and its derivatives, N-vinyl monomers, and halogenated vinyl monomers,
   (B) at least one free-radical generator chosen among diazo compounds, peroxides and dialkyldiphenylalkanes,
   (C) molecular iodine, and
   (D) at least one oxidant whose solubility in water is at least 10 g/l, at least one of which is optionally one of (B);
   wherein said process comprises:
   (1) introducing at least one fraction of each of the compounds (A), (B), (C) and (D) into a reactor;
   (2) reacting the contents of the reactor while introducing any balance of each of the compounds (A), (B), (C) and (D) therein; and
   (3) obtaining an aqueous dispersion comprising the polymer constituting the first block of the block copolymer.

3. The process according to claim 2, wherein said process is a process of polymerization in aqueous suspension and where (B) and (D) are as follows:
   (B) at least one oil-soluble free-radical generator selected from the group consisting of oil-soluble diazo compounds and oil-soluble peroxides, and
   (D) at least one oxidant whose solubility in water is at least 10 g/l, none of which is one of (B).

4. The process according to claim 2, wherein said process is a process of polymerization in aqueous emulsion and where (B) and (D) are as follows:

(B) at least one water-soluble free-radical generator selected from the group consisting of water-soluble diazo compounds, and water-soluble peroxides, and
(D) at least one oxidant whose solubility in water is at least 10 g/l, at least one of which can be one of (B).

5. The process according to claim 4, where (B) and (D) are as follows:
(B) at least one water-soluble free-radical generator selected from the group consisting of water-soluble diazo compounds and water-soluble peroxides, and
(D) one oxidant whose solubility in water is at least 10 g/l, which is one of (B).

6. The process according to claim 5, where (B) and (D) are as follows:
(B) one water-soluble free-radical generator selected from the group consisting of water-soluble diazo compounds and water-soluble peroxides, and
(D) one oxidant whose solubility in water is at least 10 g/l, which is (B).

7. The process according to claim 5, where (B) and (D) are as follows:
(B) two water-soluble free-radical generators selected from the group consisting of water-soluble diazo compounds and water-soluble peroxides, and
(D) one oxidant whose solubility in water is at least 10 g/l, which is one of (B).

8. The process according to claim 4, where (B) and (D) are as follows:
(B) at least one water-soluble free-radical generator selected from the group consisting of water-soluble diazo compounds and water-soluble peroxides, and
(D) two oxidants whose solubility in water is at least 10 g/l, each being one of (B).

9. The process according to claim 4, where (B) and (D) are as follows:
(B) at least one water-soluble free-radical generator selected from the group consisting of oil-soluble diazo compounds and oil-soluble peroxides, and
(D) one oxidant whose solubility in water is at least 10 g/l, which is not one of (B).

10. The process according to claim 2, wherein said process is a process of polymerization in aqueous mini-emulsion and where (B) and (D) are as follows:
(B) at least one oil-soluble free-radical generator selected from the group consisting of oil-soluble diazo compounds and oil-soluble peroxides and/or at least one water-soluble free-radical generator selected from the group consisting of water-soluble diazo compounds and water-soluble peroxides, and
(D) at least one oxidant whose solubility in water is at least 10 g/l, of which at least one is optionally one of (B).

11. The process according to claim 2, wherein a second block of the block copolymer is prepared using
(p) the polymer constituting the first block of the block copolymer obtained in (3),
(a) at least one ethylenically unsaturated monomer of which one is used as main monomer and is chosen among styrene and its derivatives, acrylic acid and its derivatives, methacrylic acid and its derivatives, dienes, vinyl esters, vinyl ethers, vinyl derivatives of pyridine, vinylsulphonic acid and its derivatives, vinylphosphonic acid and its derivatives, N-vinyl monomers and halogenated vinyl monomers,
(b) optionally at least one free-radical generator chosen from diazo compounds, peroxides and dialkyldiphenylalkanes,
(d) optionally at least one oxidant whose solubility in water is at least 10 g/l, at least one of which can be one of (b);
wherein said process comprises:
(1') introducing said first block (p) and at least one fraction of each of the compounds (a), (b) and (d) into a reactor;
(2') reacting the contents of the reactor while introducing any balance of each of the compounds (a), (b) and (d) therein; and
(3') obtaining an aqueous dispersion comprising the block copolymer with two blocks.

12. The process according to claim 11, wherein,
the first block of which is prepared using (A) at least one ethylenically unsaturated monomer of which one is used as main monomer and is selected from the group consisting of styrene and its derivatives, acrylic acid and its derivatives, methacrylic acid and its derivatives, dienes, vinyl esters, vinyl ethers, vinyl derivatives of pyridine, vinylsulphonic acid and its derivatives, vinylphosphonic acid and its derivatives, and N-vinyl monomers; and
the second block of which is prepared using (a) at least one ethylenically unsaturated monomer of which one is used as main monomer and chosen among halogenated vinyl monomers.

13. The process according to claim 12, wherein (A) is at least one ethylenically unsaturated monomer of which one is used as main monomer for the first block and selected from the group consisting of styrene and its derivatives, acrylic acid and its derivatives, and methacrylic acid and its derivatives; and wherein the main monomer used for the second block is (a) vinylidene chloride.

14. The process according to claim 1, wherein the process provides a block copolymer whose ratio of experimental molecular weight to theoretical molecular weight is at least 0.84.

15. The process according to claim 3, wherein (B) is follows:
(B) a single oil-soluble free-radical generator selected from the group consisting of oil-soluble diazo compounds and oil-soluble peroxides.

16. The process according to claim 3, wherein (D) is as follows:
(D) a single oxidant whose solubility in water is at least 10 g/l.

17. The process according to claim 3, wherein (D) is as follows:
(D) hydrogen peroxide.

18. The process according to claim 10, wherein (B) and (D) are as follows:
(B) at least one oil-soluble free-radical generator selected from the group consisting of oil-soluble diazo compounds and oil-soluble peroxides;
(D) at least one oxidant whose solubility in water is at least 10 g/l, none of which is one of (B).

19. The process according to claim 10, wherein (B) and (D) are as follows:
(B) at least one water-soluble free-radical generator selected from the group consisting of water-soluble diazo compounds and water-soluble peroxides;
(D) at least one oxidant whose solubility in water is at least 10 g/l, at least one of which is one of (B).

20. The process according to claim 2, wherein the process provides a block copolymer whose ratio of experimental molecular weight to theoretical molecular weight is at least 0.84.

* * * * *

UNITED STATES PATENT AND TRADEMARK OFFICE
CERTIFICATE OF CORRECTION

| | | |
|---|---|---|
| PATENT NO. | : 8,541,524 B2 | |
| APPLICATION NO. | : 12/305255 | |
| DATED | : September 24, 2013 | |
| INVENTOR(S) | : Chrisophe Fringant et al. | |

It is certified that error appears in the above-identified patent and that said Letters Patent is hereby corrected as shown below:

In the Claims:

Column 30, lines 35, "The process according to claim 3, wherein (B) is follows:" should read --The process according to claim 3, wherein (B) is as follows:--

Signed and Sealed this
Fourteenth Day of January, 2014

Michelle K. Lee
*Deputy Director of the United States Patent and Trademark Office*